United States Patent [19]
Keller

[11] Patent Number: 5,900,086
[45] Date of Patent: * May 4, 1999

[54] PROCESS FOR PRODUCING A TUBULAR BODY AND PROCESS FOR PRODUCING A TUBE WITH THE USE OF THE TUBULAR BODY

[75] Inventor: Gerhard Keller, Jongny, Switzerland

[73] Assignee: AISA Automation Industrielle SA, Vouvry, Switzerland

[*] Notice: This patent is subject to a terminal disclaimer.

[21] Appl. No.: 08/776,211

[22] PCT Filed: Jun. 19, 1996

[86] PCT No.: PCT/EP96/02645

§ 371 Date: Jan. 22, 1997

§ 102(e) Date: Jan. 22, 1997

[87] PCT Pub. No.: WO97/00208

PCT Pub. Date: Jan. 3, 1997

[30] Foreign Application Priority Data

Jun. 19, 1995 [DE] Germany .............. 195 22 169

[51] Int. Cl.[6] .................. B29C 53/36; B65D 35/22
[52] U.S. Cl. .................. 156/69; 156/203; 156/218; 220/553; 220/555; 222/94; 493/297; 493/931
[58] Field of Search .................. 156/203, 218, 156/69; 222/94; 220/553, 555; 493/297, 931, 90

[56] References Cited

U.S. PATENT DOCUMENTS

| 1,894,115 | 1/1933 | Murphy ............... 222/94 |
|---|---|---|
| 3,104,596 | 9/1963 | Bergstein et al. ...... 493/90 X |
| 3,572,220 | 3/1971 | Nerenberg .............. 493/297 |
| 3,788,520 | 1/1974 | Dukess . | 
| 3,948,704 | 4/1976 | Evans .................... 156/69 |
| 3,980,222 | 9/1976 | Hood ..................... 222/94 X |
| 4,089,437 | 5/1978 | Chutter et al. . |
| 5,782,384 | 7/1998 | Mustafa et al. .......... 222/94 |

FOREIGN PATENT DOCUMENTS

| 0340657 | 11/1989 | European Pat. Off. . |
|---|---|---|
| 2453492 | 5/1975 | Germany . |
| 61-141533 | 6/1986 | Japan ................... 156/218 |
| 1030275 | 5/1966 | United Kingdom . |

*Primary Examiner*—Adrienne Johnstone
*Attorney, Agent, or Firm*—Collard & Roe, P.C.

[57] ABSTRACT

A process produces a tubular body with at least one dividing wall extending across its length and forming longitudinal chambers disposed next to each other. A foil strip is used whereby a dividing-wall strip or a section of dividing-wall strip is cut to length and is fastened at its lateral outer edges on the foil strip or section of the foil strip, with parallel alignment with the foil strip or section of foil strip. The lateral edges of the foil strip or section of foil strip are then joined with each other thereby either directly forming a tubular body or forming an endless tube, from which tubular bodies are then cut to length. The tube is then solidly joined with a tube head having a dividing bridge conforming to the arrangement of the dividing wall in the tubular body. The tube head has a dispensing aperture closable by a closure.

14 Claims, 3 Drawing Sheets

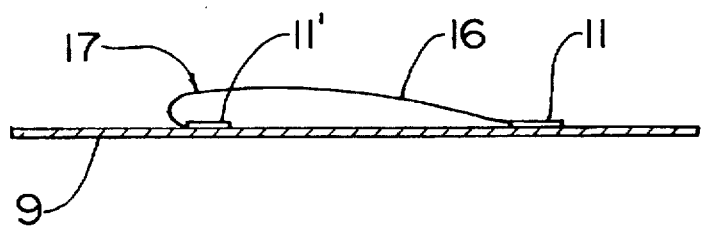
FIG. 4
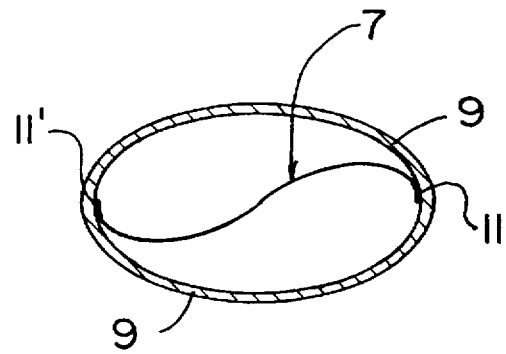
FIG. 5
FIG. 6
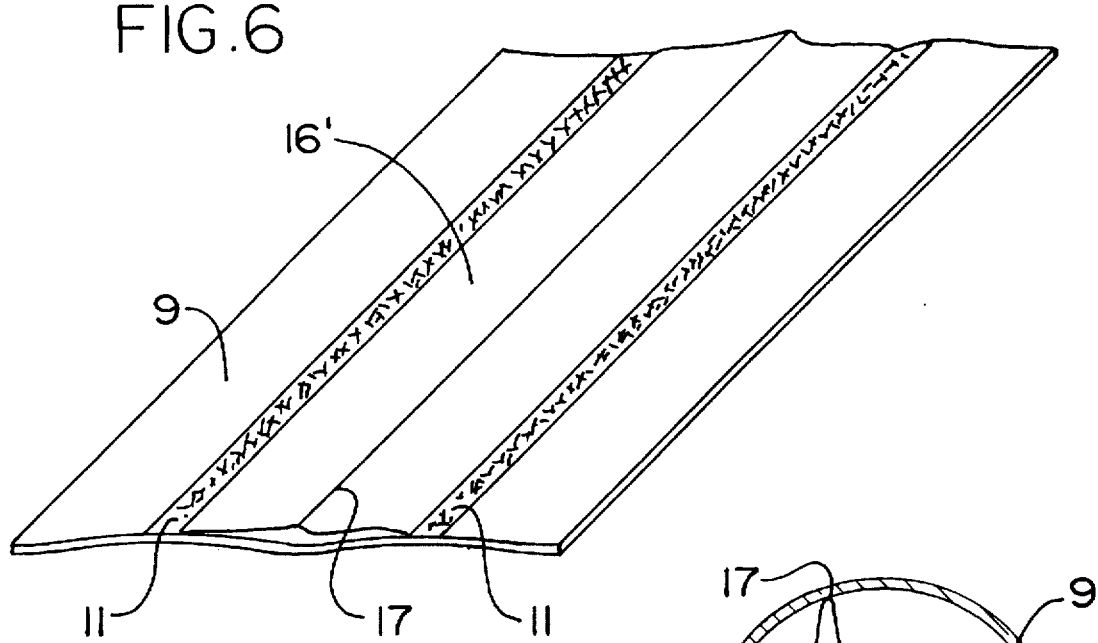
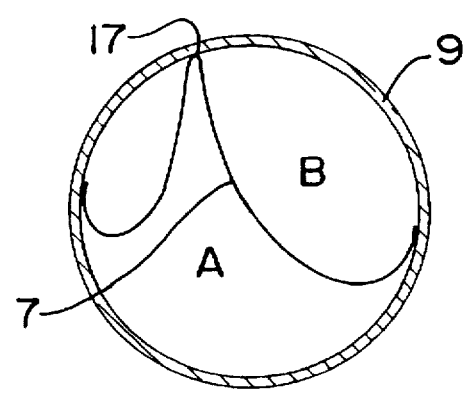
FIG. 7

1

PROCESS FOR PRODUCING A TUBULAR BODY AND PROCESS FOR PRODUCING A TUBE WITH THE USE OF THE TUBULAR BODY

BACKGROUND OF THE INVENTION

1. Field of the Invention

The invention relates to a process for producing a particularly multi-layered tubular body with at least one dividing wall extending across its length and forming longitudinal chambers disposed next to each other, with the use of a foil strip.

2. The Prior Art

A process for producing a tubular body for a tube-like container is known from DE-A1-24 53 492, according to which a multi-layered, thin board is wound, made shaft-like and assembled in such a way that the tubular wall, a centrally or chord-like extending intermediate wall, and seams extending in the circumferential direction and overlapping each other in the longitudinal direction are formed as one piece. The overlapping zones extending in the circumferential direction are sealed by heat or fused, so that longitudinally extending overlap connections or seams are formed. The dividing wall divides the space within the tubular body in two longitudinally extending chambers, which are arranged next to each other.

The manufacture of the thin boards, the molding of the uniform tubular body with the interior dividing wall, and the manufacture of the two longitudinal seams are relatively costly.

For manufacturing two- or multi-chambered tubes with a round or oval cross section, it is known, furthermore, to produce tubular bodies by the injection molding process, cf. for example, U.S. Pat. No. 3,788,520, or by forming an overlapping seam from a strip of foil, cf. for example, GB-PS 1 030 275, and to then, in a further production step, insert in the tubular body an intermediate wall, and to join the latter solidly with the tubular body, if need be.

Inserting an intermediate wall and anchoring it or mounting it in a tight way in a manufactured tubular body is extremely costly in terms of expenditure and requires many production steps, which prevents a high production output rate.

The tubular bodies produced according to the known processes are joined with a tube head, which is prefabricated or molded on the body, such tube head also having a separation bridge for the connection with the dividing wall, such bridge extending into the dispensing aperture. Above the dispensing aperture, provision is made for a closure, the latter covering the dispensing aperture or resting against the separation bridge.

A two-chamber tube is known from U.S. Pat. No. 3,788,520, whereby two tubular bodies are arranged one in the other. The closing cap has an inner cylindrical projection which, when the closing cap on the tube head is in the closing condition, communicate with the separation bridge, the latter ending below the top edge of the dispensing aperture, and separates the two chambers from each other also in the head of the tube.

SUMMARY OF THE INVENTION

The problem of the invention is to specify a process for producing a particularly multi-layered tubular body with at least one dividing wall extending across its length and forming longitudinal chambers disposed next to each other, with the use of a strip of foil, which process can be carried out in a simple and quick way and also permits the manufacture of tubular bodies of any desired length.

Furthermore, the problem of the invention is to specify a process for the manufacture of tubes, with the use of tubular bodies produced according to the novel process.

The problem is solved by a process for producing a particularly multi-layered tubular body with at least one dividing wall extending across its length and forming longitudinal chambers disposed next to each other, with the use of a strip of foil, whereby a dividing wall strip, or a section of dividing wall strip cut to length, is first fastened with its outer edges on the foil strip, or on a section of foil strip cut to length, with parallel alignment with the foil strip or section of foil strip, and the lateral edges are then joined with each other for forming an endless tube, from which tubular bodies are then cut to length, or for directly forming a tubular body.

BRIEF DESCRIPTION OF THE DRAWINGS

The invention is explained in greater detail in the following by reference to exemplified implementations and to the drawings, in which;

FIG. 4 shows a cross section through another foil for producing a tubular body with two chambers;

FIG. 5 shows a sectional view of a tubular body produced from the foil according to FIG. 4;

FIG. 6 shows a perspective view of a third foil for producing a tubular body with two chambers;

FIG. 7 shows a sectional view of a tubular body produced from the foil according to FIG. 6;

DETAILED DESCRIPTION OF THE PREFERRED EMBODIMENTS

Figure 1:
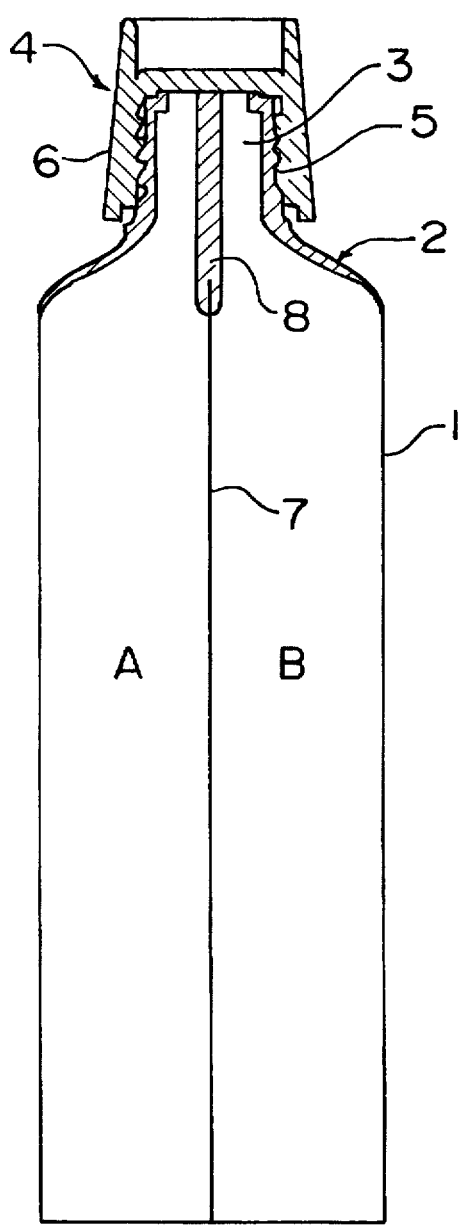
FIG. 1 shows a longitudinal section through a two-chamber tube with screw closure.

The tube schematically shown in FIG. 1 has a tubular body 1, which is solidly joined with a tube head 2. A short-pipe-like dispensing aperture 3 is formed in the tube head 2, said aperture being closable by a closing cap 4. In the exemplified embodiment according to FIG. 1, the closing cap 4 is designed as a screw cap 5, which can be screwed to an outside thread 6 surrounding the socket-shaped dispensing aperture 3. A dividing wall 7 is arranged in the tubular body 1, said wall dividing the tubular body 1 in the two longitudinal chambers A and B. In the extension of the dividing wall 7, the tube head 2 has a separation bridge 8 which, in the exemplified embodiment according to FIG. 1, extends up to the closing plane of the dispensing aperture 3.

The tubular body 1 can be produced from any desired known single- or multi-layer material, such as a plastic material, with or without barrier layer from a foil strip 9 by forming a connecting seam 10, for example an overlapping seam by means of the outer edges of the foil strip 9.

The tube head 2 can be manufactured separately single- or multi-layered with or without barrier layer, and can be joined with the tubular body 1, for example by fusing. But it also can be manufactured by directly shaping plasticized plastic material by molding on the prefabricated tubular body 1.

The dividing wall 7 can consist of the same material as the tubular body 1, or of any other desired, known and suitable material, such as a plastic material, with or without barrier layer. Preferably, the dividing wall 7 consists of a material with a thickness of from 50 to 300µ, i.e., its thickness is clearly below the one of the foil for the tubular body 1, which usually comes to between 300 and 500µ. For example, the dividing wall 7 may consist of LDPE (Low Density Polyethylene). It has been found that the thinner the dividing wall 7 is designed, the more uniform is the joint discharge from the two chambers A and B.

If an absolute separation of the product components that are to be received in the longitudinal chambers A and B is not required prior to their dispensing, the tube head 2 also can be designed without the separation bridge 8, so that quasi a mixing chamber is obtained in the tube head.

However, if such separation is required, the cross section of the separation bridge 8 has to correspond with or has to be adapted to the shape of the dividing wall 7 in the site of contact of the tube head 2 with the tubular body 1. Preferably, the top end of the dividing wall 7 is fastened on the separation bridge 8—or vice versa—in such a way that the longitudinal chambers A, B are separated from each other up into the dispensing aperture 3 sealed by the closing cap 4. Preferably, the bottom end of the dividing bridge 8 encloses the top end of the dividing wall 7 (see FIG. 1). The bottom end of the separation bridge 8, 8' also may project beyond the basic level of the tube head 2, as can be clearly seen in FIG. 8.

In the exemplified embodiment shown in FIG. 1, the top end of the separation bridge 8 ends in the closing plane of the dispensing aperture 3, i.e., the top edge of the wall surrounding the dispensing aperture 3 and the top edge of the separation bridge 8 are disposed in the same plane. In its closing position, the mounted closing cap 4 tightly rests against said top edges and prevents the product components in the two longitudinal chambers A, B from coming into contact with one another. In this connection, the dividing bridge 8 also divides the entire length of the dispensing aperture 3 in preferably two equal parts.

Figure 8:
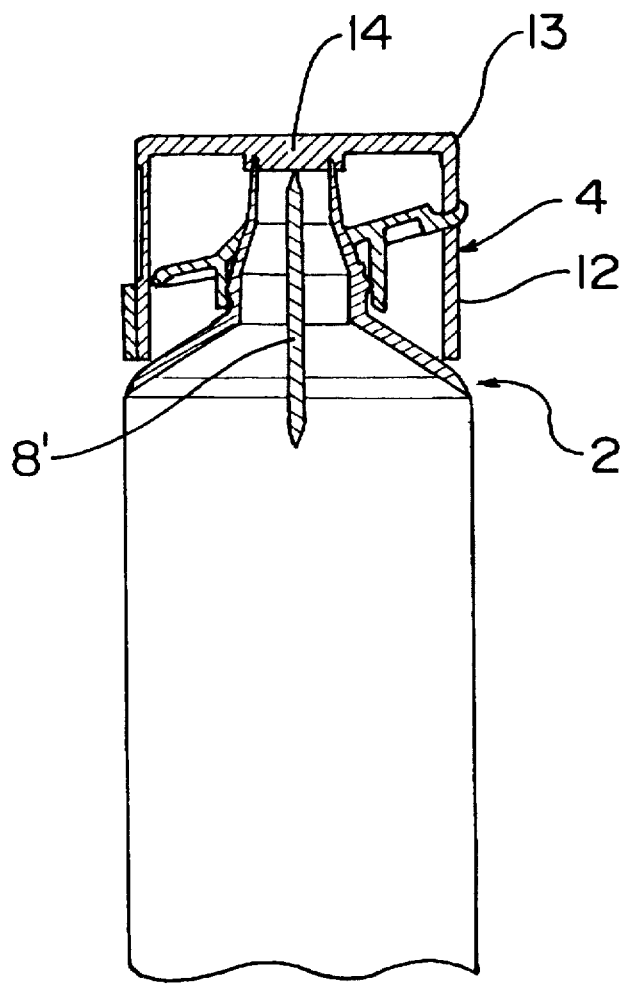
FIG. 8 shows a longitudinal section through a cutout of a two-chamber tube with a folding closure.

Another variation—see, for example, the closing cap 4 in FIG. 8, which is shown as a folding closure 12 with the hinged, swingable lid 13—may consist in that the top edge of the dividing bridge 8 in the tube head 2 ends below the top edge of the dispensing aperture 3. So as the assure in this case, too, complete separation of the two components in the longitudinal chambers A, B when the tube is closed, the closing cap 4 has in this case a projection 14 (FIG. 8) conforming to the cross section of the dispensing aperture 3 and having preferably cylindrical parts, said projection, when the closing cap 4 is in the closing position, resting tightly against the free top edge of the dividing bridge 8' and assuring separation of the two longitudinal chambers A, B. If need be, the projection also may have another shape conforming to the dispensing aperture 3, as well as sealing edges and/or elastic elements.

The folding closure 12 may be fastened on the tube head 2 by means of a snap connection (see FIG. 8), or also by a fixed fused or glued connection.

Figure 9:
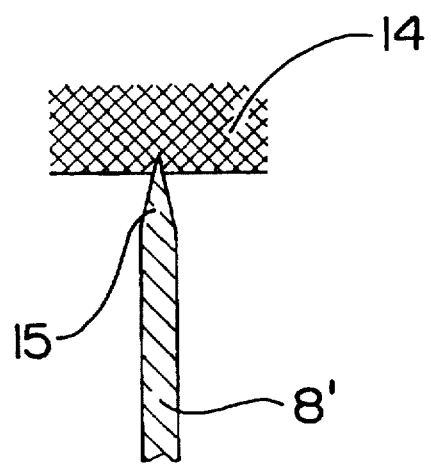
FIG. 9 shows a cutout from FIG. 8 showing on an enlarged scale the cooperation of the separation bridge with the projection of the closing cap.

It is particularly shown in FIG. 9 that the free top end of the dividing bridge 8 can have a preferably blade-like, projecting sealing edge 15.

The sealing edge 15 may be designed elastically yielding, in particular in connection with rotary closures, or also rigid, in particular in connection with folding closures. If the sealing edge 15 is designed rigid, the projection 14 of the closing cap 4 preferably should have a yielding countersurface, into which the sealing edge 15 can slightly penetrate for assuring practically absolute tightness (FIG. 9); if the projecting sealing edge 15 is elastically yielding, a type of pretension can be achieved, when then assures tightness when excess pressure prevails in the chambers A, B.

Figure 2:
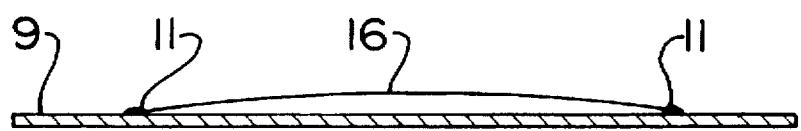
FIG. 2 shows a cross section through a foil for producing a tubular body with two chambers.

The tubular body 1 for a tube with the dividing wall 7 can be manufactured in a simple way by arranging on an endless foil strip 9 (see FIGS. 2, 4 and 6) for producing a known tube body an endless dividing-wall strip 16, 16', continuously and with parallel alignment with the foil strip 9, and by rigidly connecting said dividing-wall strip with its two outer edges—the latter serving as the fastening strip 11—in a plane way (FIG. 2) with the foil strip 9, or as a fold 17 at least along one of the edges (FIG. 4), i.e., once plane and once folded over along the edge, for example by fusing or gluing. If the dividing-wall strip 16 is fastened on the foil strip 9 (see FIG. 4) plane on one edge and on the other edge overlapping with the fold 17, the edges of the dividing-wall sides each rest tangentially against the wall of the tubular body (see FIG. 5). From the preliminary material so produced, a tube is then manufactured in a second step according to a known process, for example by forming an overlapping seam. Subsequently, individual tubular bodies of the desired length are separated from the tube.

It is possible also to first divide the foil strip 9 in sections of the desired length, to which sections of the dividing-wall strip cut to a corresponding length are then applied and fastened thereon, for example by fusing or gluing. Tubular bodies 1 of a predetermined length can then be produced from the preliminary material so produced, for example by a winding operation in connection with overlapping by fusing or gluing.

Figure 3:
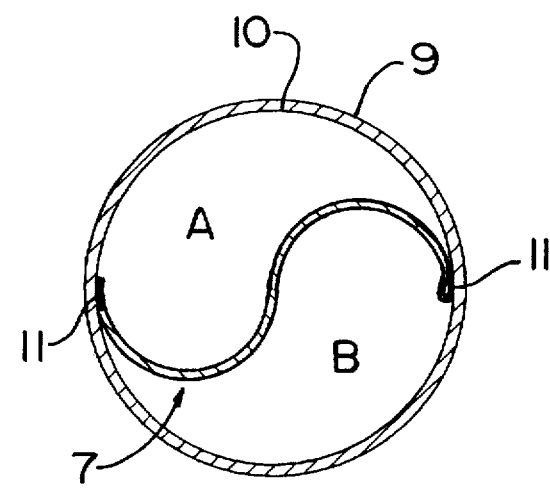
FIG. 3 shows a sectional view of a tubular body produced from the foil according to FIG. 2.

The tube and the tubular bodies 1 may be provided with a circular (FIGS. 3 and 7) or with an oval (FIG. 5) cross sectional shape.

In the exemplified embodiment shown in FIG. 6, the dividing-wall strip 16' applied to the foil strip 9 has at least one bent fold 17 aligned parallel with the fastening strips 11 and thus also parallel with the longitudinal expanse of the foil strip 9. FIG. 7 shows that a bent fold 17—also two or more bent folds directed against each (not shown), if need be—permits a predetermined alignment of the dividing wall 7 within the tubular body 1, which can be varied by arranging the bent fold 17 or the bent folds in the cross section of the dividing-wall strip 16'. Especially if the thickness of the dividing-wall strip is very low, such bent folds are advantageous because they equally sized cross sectional openings, or also cross sectional openings of any desired size, of the chambers A and B, as required for filling the latter.

A preferred arrangement of a bent fold 17 in the dividing-wall strip 16' may consist in that the dividing-wall strip 16' is divided at a ratio of 1:3 to 1:5.

Also, it is possible to arrange a plurality of dividing-wall strips for producing more than two longitudinal chambers, or to fasten a wider dividing-wall strip also between its edges on the foil strip (not shown). Since fastening takes place along lines, it is possible to exactly predetermine the desired space conditions of the individual chambers, whereby, of course, it is possible also to preshape also the cross section of the dividing-wall strip in a wavy form and to fasten the latter with the parallel wave troughs on the plane or also corrugated foil strip. In this connection, each subdivided section of a dividing-wall strip or each individual dividing-wall strip should have at least one bent fold. Therefore, it is possible without greater expenditure to produce chambers with the same or any other space conditions. If need be, the dividing bridges in the tube head have to be adapted to the given number and shape of the dividing walls.

If several chambers are present, one chamber or also several chambers, if need be, may be filled with a propellant which, on the one hand, assures easier dispensing of the filled material, and also an attractive round appearance of of the multi-chamber tube when the filled material has almost been dispensed, on the other hand.

I claim:

1. Process for producing a tubular body with at least one dividing wall extending across its length and forming longitudinal chambers disposed next to each other, with the use of a foil strip, whereby a dividing-wall strip or a section of the dividing-wall strip cut to length is fastened at its lateral outer edges on the foil strip or on a section of the foil strip cut to length, with parallel alignment with the foil strip or the section of the foil strip, and the lateral edges of the foil strip or the section of the foil strip are then connected with each other thereby either forming an endless tube, from which tubular bodies are then cut to length, or directly forming a tubular body.

2. Process according to claim 1, characterized in that the dividing-wall strip or the section of the dividing-wall strip fastened on the foil strip or on the section of the foil strip is folded over as a fold at least along one lateral outer edge.

3. Process according to claim 1, characterized in that the dividing-wall strip or the section of the dividing-wall strip is additionally fastened on the foil strip or section of foil strip between its lateral outer edges thereby forming a plurality of chambers.

4. Process according to claim 1, characterized in that the dividing-wall strip or the section of dividing-wall strip is, in a wavy form, fastened at its wave troughs on the foil strip or section of foil strip.

5. Process according to claim 1, characterized in that the dividing-wall strip or the section of dividing-wall strip is made of a first plastic material and the foil strip or section of foil strip is made of a second plastic material different than the first plastic material.

6. Process according to claim 1, characterized in that in the dividing-wall strip or the section of dividing-wall strip, at least one bent fold extending parallel with its lateral outer edges is made.

7. Process according to claim 6, characterized in that a single bent fold is made in a way such that it subdivides the dividing-wall strip or the section of dividing-wall strip at a ratio of 1:3 to 1:5.

8. Process according to claim 1, characterized in that the dividing-wall strip or the section of dividing-wall strip has a thickness of from 50µ to 300µ, which thickness is clearly below that of the foil strip or section of foil strip.

9. Process according to claim 1, characterized in that the endless tube or the tubular body is produced with an oval cross section.

10. Process for producing a tubular body and joining said tubular body with a tube head, said tubular body having at least one dividing wall extending across its length and forming longitudinal chambers disposed next to each other, with the use of a foil strip, whereby a dividing-wall strip or a section of the dividing-wall strip cut to length is fastened at its lateral outer edges on the foil strip or on a section of the foil strip cut to length, with parallel alignment with the foil strip or the section of the foil strip, and the lateral edges of the foil strip or the section of the foil strip are then connected with each other thereby either forming an endless tube, from which tubular bodies are then cut to length, or directly forming a tubular body, the process characterized in that the tubular body is solidly joined with the tube head having a dividing bridge conforming to the arrangement of the dividing wall in the tubular body, said tube head having a dispensing aperture closable by a closure.

11. Process according to claim 10, characterized in that the top free end of the dividing bridge ends below the closing plane of the dispensing aperture, and that the closure has a projection which, in the closing position, tightly rests against the top free end of the dividing bridge, sealing the subdivided part of the dispensing aperture.

12. Process according to claim 11, characterized in that the top free end of the dividing bridge is provided with a sealing edge.

13. Process according to claim 10, characterized in that the bottom end of the dividing bridge projects downwardly beyond the basic level of the tube head.

14. Process according to claim 10, characterized in that the bottom end of the dividing bridge is connected with the top end of the dividing wall in such a way that the top end of the dividing wall is enclosed by the bottom end of the dividing bridge.

\* \* \* \* \*